US012335865B2

(12) United States Patent
Huang et al.

(10) Patent No.: US 12,335,865 B2
(45) Date of Patent: Jun. 17, 2025

(54) BASE STATIONS AND METHODS FOR WIRELESS COMMUNICATION NETWORKS

(71) Applicant: Telefonaktiebolaget LM Ericsson (publ), Stockholm (SE)

(72) Inventors: Tao Huang, Beijing (CN); Junming Li, Beijing (CN); Yin Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 749 days.

(21) Appl. No.: 17/598,469

(22) PCT Filed: Apr. 1, 2019

(86) PCT No.: PCT/CN2019/080798
§ 371 (c)(1),
(2) Date: Sep. 27, 2021

(87) PCT Pub. No.: WO2020/199075
PCT Pub. Date: Oct. 8, 2020

(65) Prior Publication Data
US 2022/0191783 A1    Jun. 16, 2022

(51) Int. Cl.
*H04W 52/02* (2009.01)
*H04W 24/08* (2009.01)
*H04W 72/543* (2023.01)

(52) U.S. Cl.
CPC ....... *H04W 52/0206* (2013.01); *H04W 24/08* (2013.01); *H04W 72/543* (2023.01)

(58) Field of Classification Search
CPC ........... H04W 52/0206; H04W 72/543; H04W 24/08
See application file for complete search history.

(56) References Cited

U.S. PATENT DOCUMENTS 6,363,252 B1 * 3/2002 Hamalainen ........ H04W 36/302
455/437
2012/0134279 A1    5/2012 Tamaki
(Continued)

FOREIGN PATENT DOCUMENTS

CN    103973344 A    8/2014
CN    104508992 A    4/2015
(Continued)

OTHER PUBLICATIONS

EPO Communication and Partial Supplementary European Search Report dated Mar. 14, 2022 for Patent Application No. 19923533.4, consisting of 11-pages.
(Continued)

*Primary Examiner* — Kevin Kim
(74) *Attorney, Agent, or Firm* — Weisberg I.P. Law, P.A.

(57) ABSTRACT

Base stations and methods for wireless communication networks, the base station having: a baseband processing unit; a first radio module including a digital signal processing block connected to the baseband processing unit, wherein the digital signal processing block is further connected to a first antenna; a second radio module connected to the baseband processing unit and having a second antenna; wherein the base station is configured to activate and deactivate the first radio module and second radio module based on the data capacity requirements of the wireless communication network.

20 Claims, 11 Drawing Sheets

(56) References Cited

U.S. PATENT DOCUMENTS

2016/0241277 A1\* 8/2016 Rexberg .................... H03F 3/24
2016/0248451 A1   8/2016 Weissman et al.
2019/0140706 A1\* 5/2019 Chang .................... H04W 24/02

FOREIGN PATENT DOCUMENTS

| CN | 109076363 A  |   | 12/2018 |
|----|--------------|---|---------|
| CN | 109245768 A  |   | 1/2019  |
| CN | 109246768 A  |   | 1/2019  |
| EP | 3002889 A1   |   | 4/2016  |
| JP | 2011166583 A | \* | 8/2011  |
| WO | 2014206461 A1 |  | 12/2014 |

OTHER PUBLICATIONS

International Search Report and Written Opinion dated Jan. 8, 2020 for International Application No. PCT/CN2019/080798 filed Apr. 1, 2019, consisting of 7-pages.
Ericsson, "Advandced antenna systems for 5G networks", Telefonaktiebolaget LM Ericsson 1994-2019, consisting of 28 pages.

\* cited by examiner

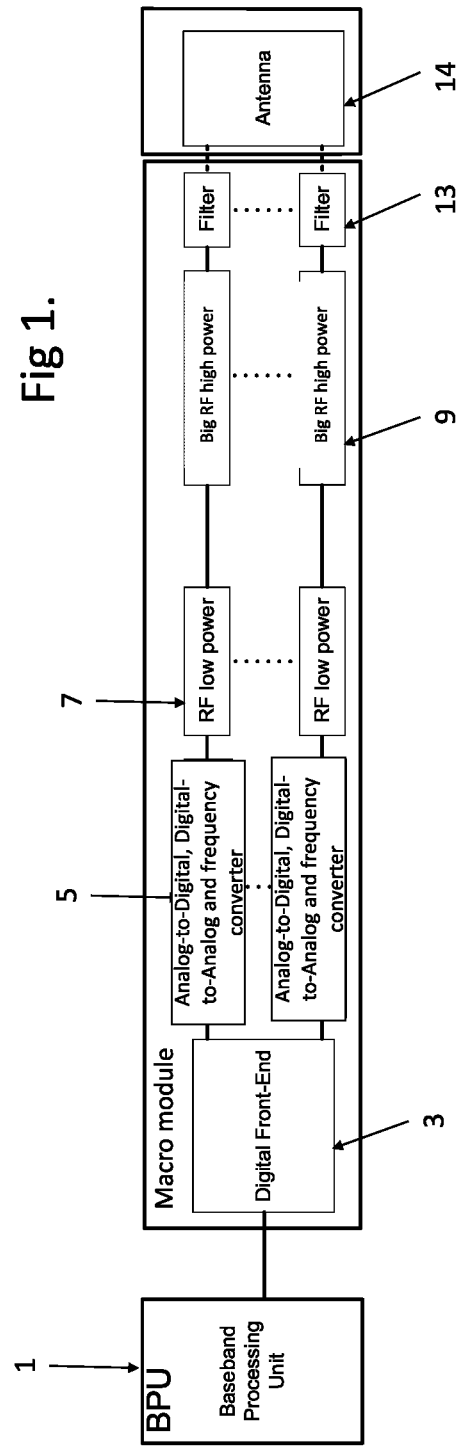

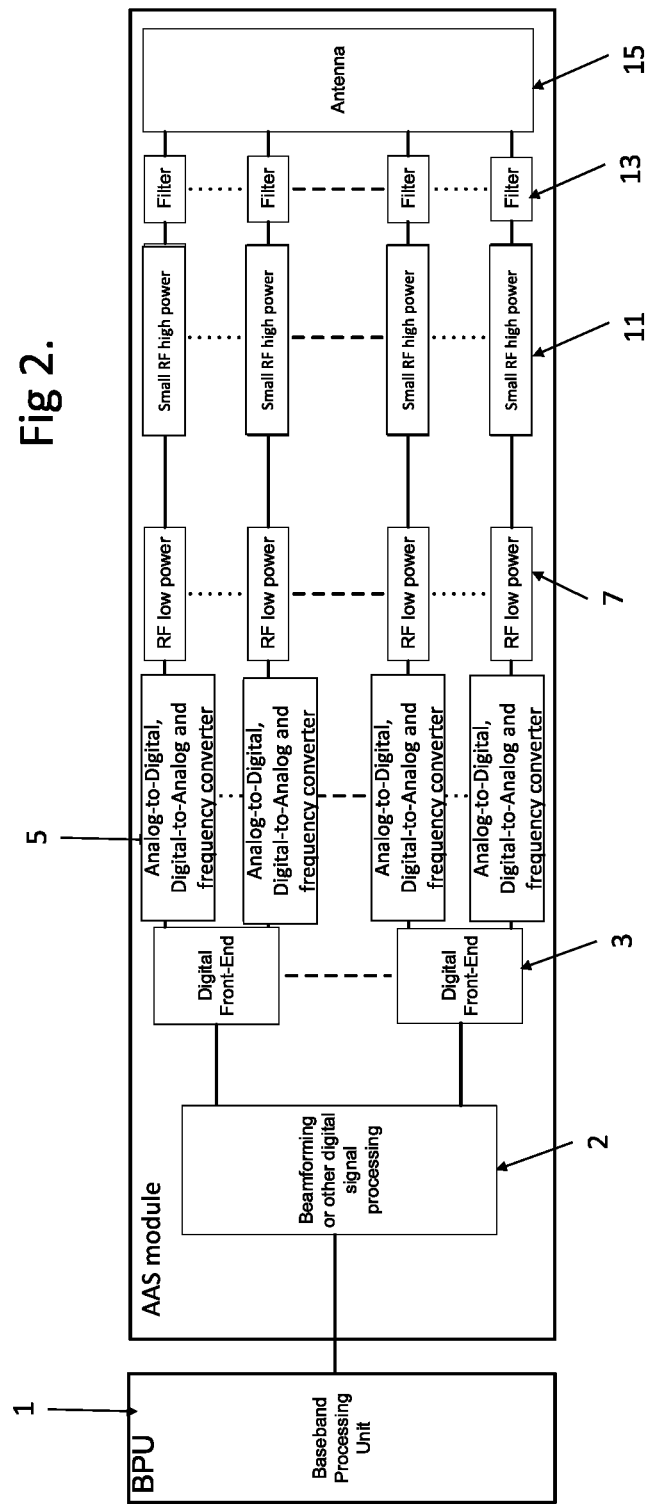

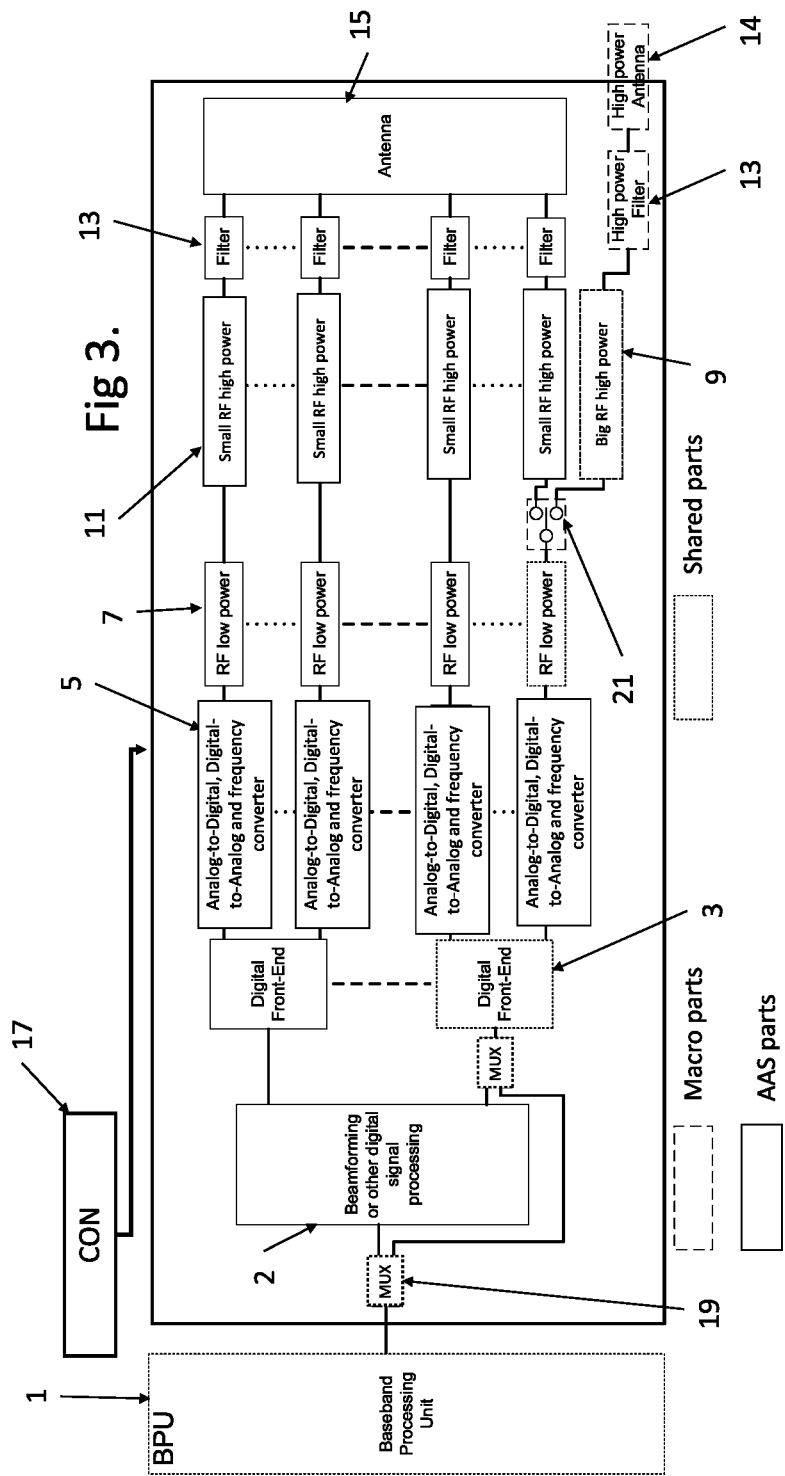

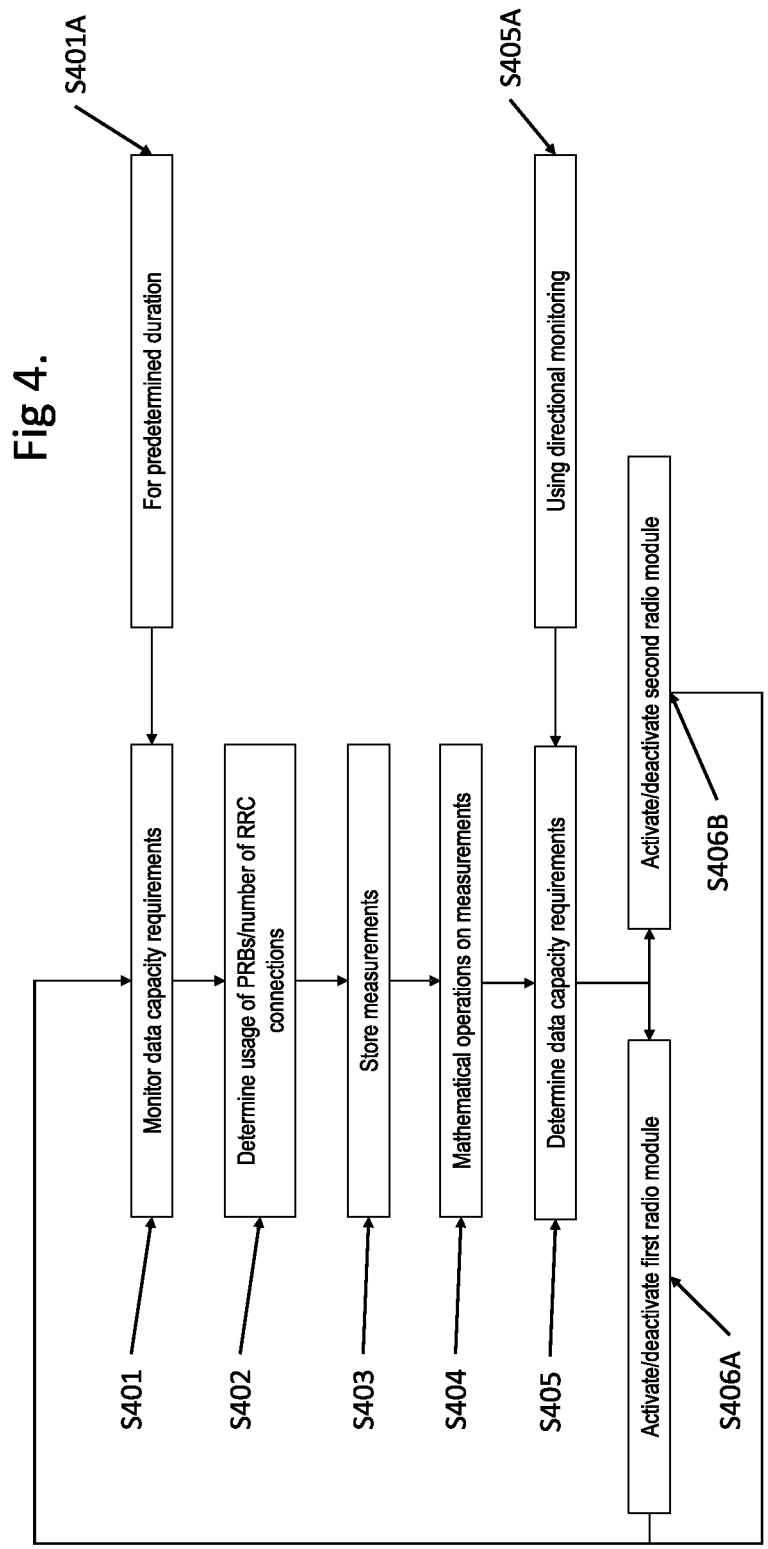

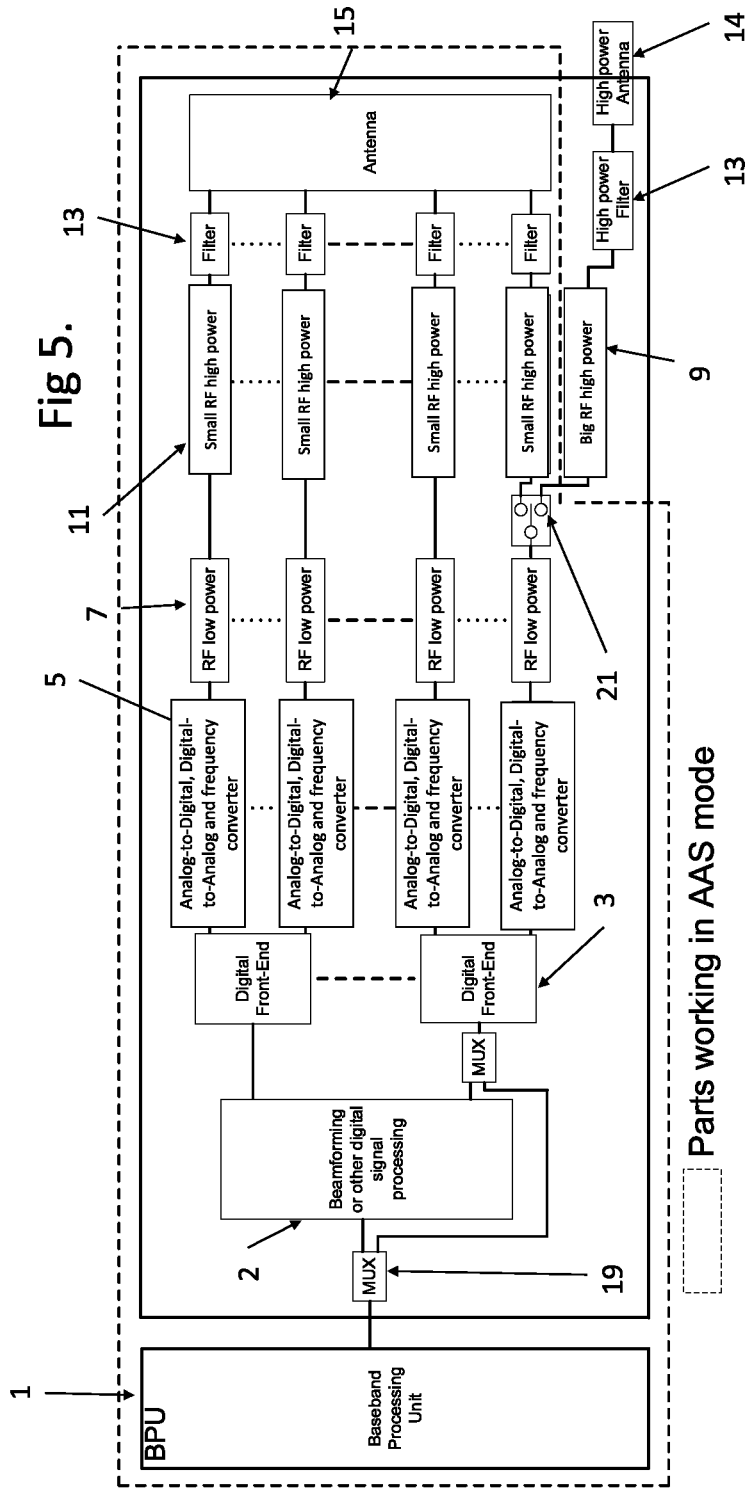

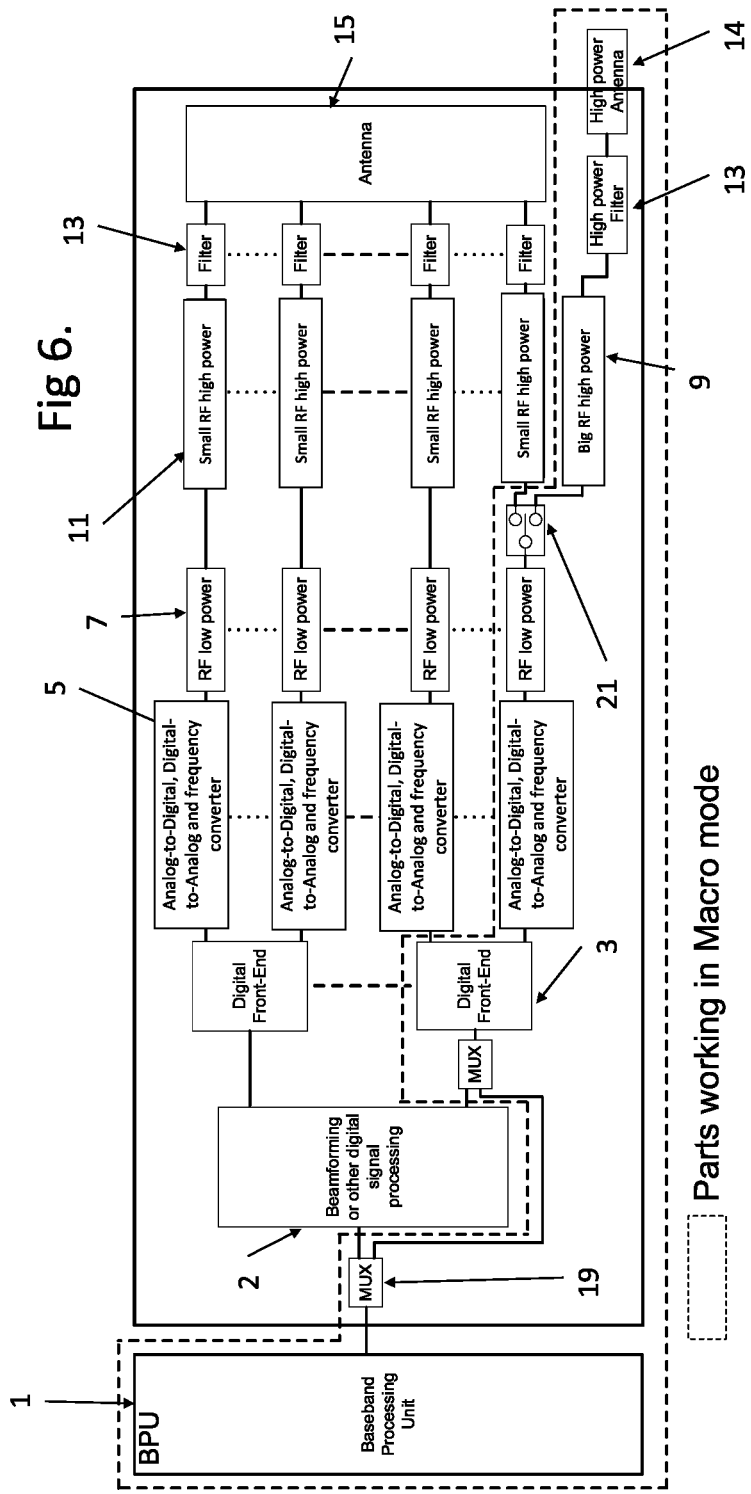

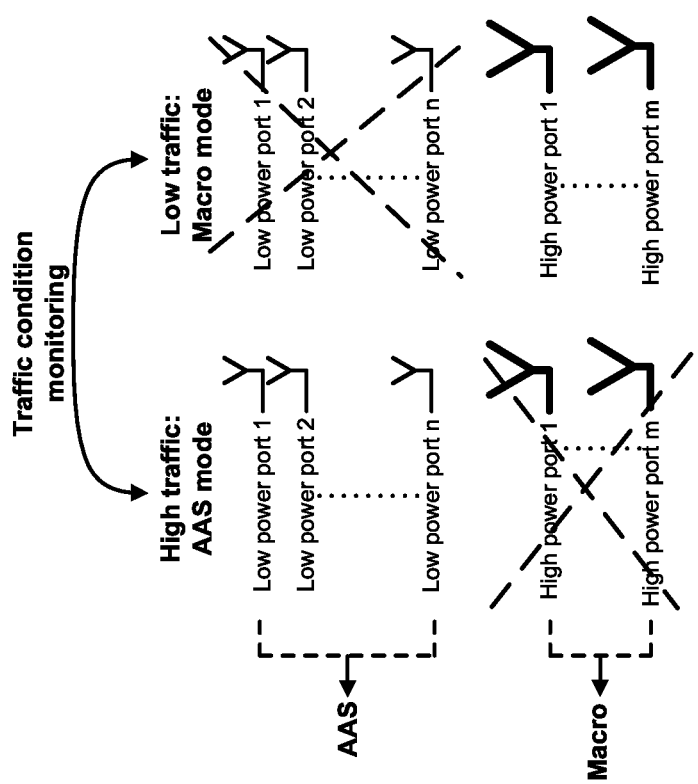

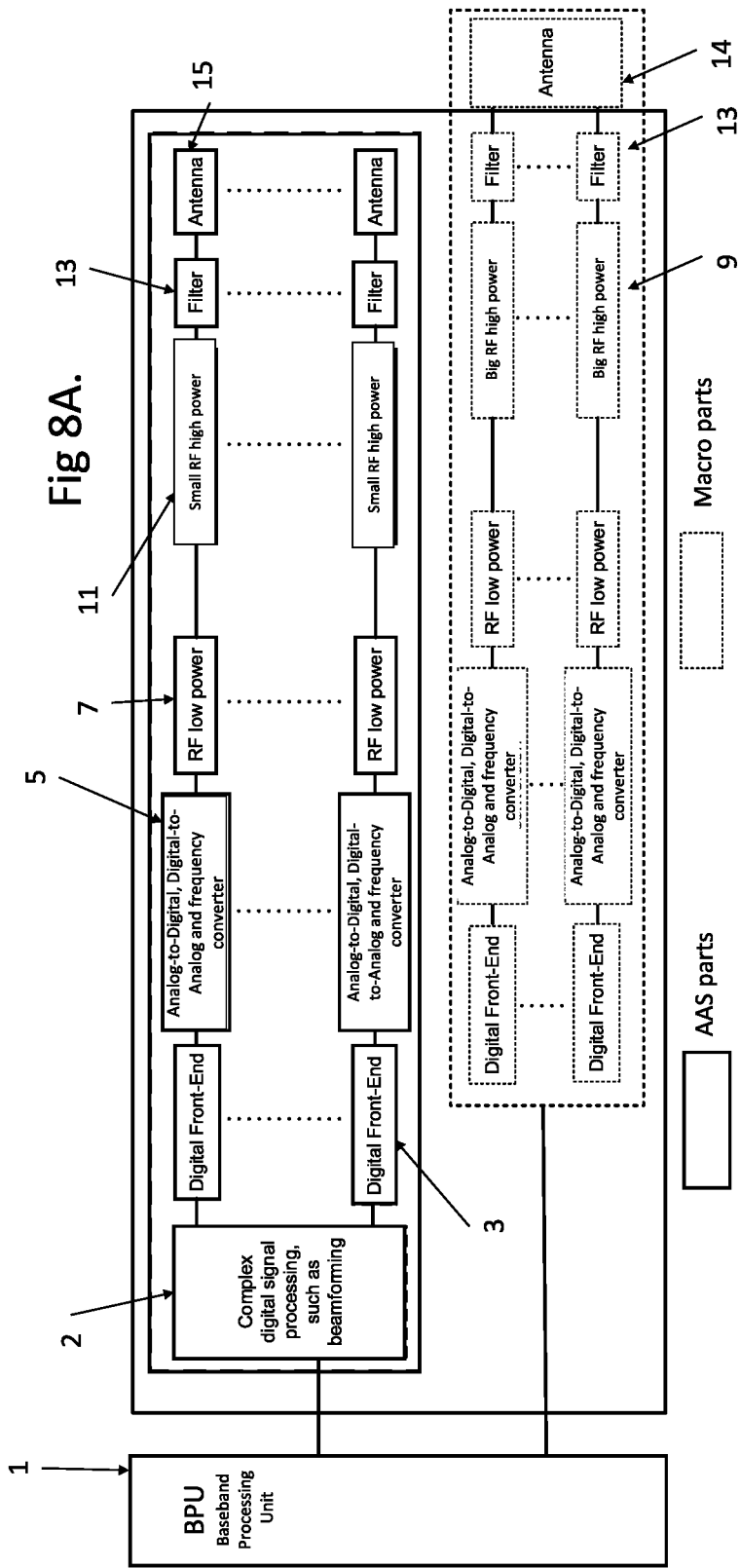

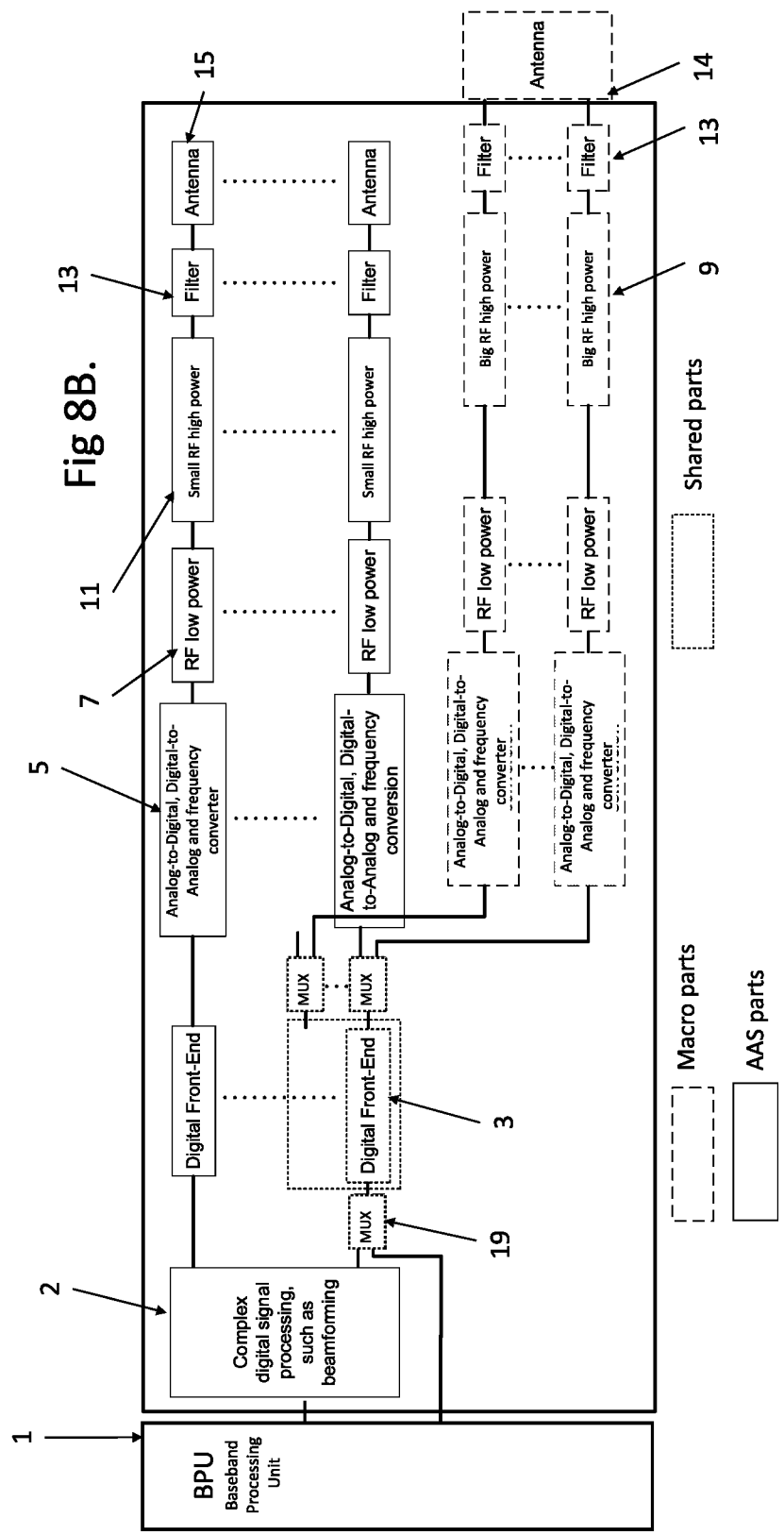

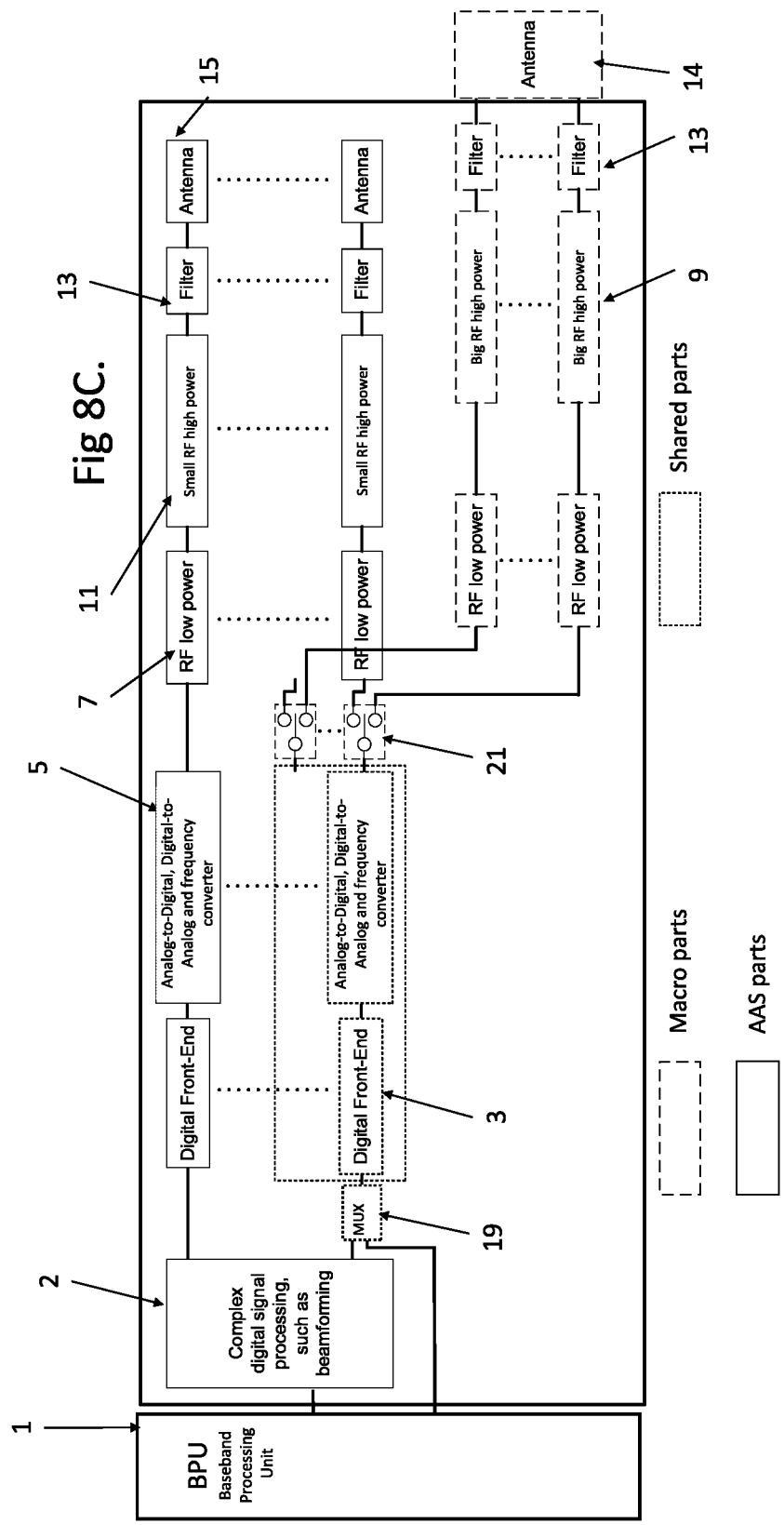

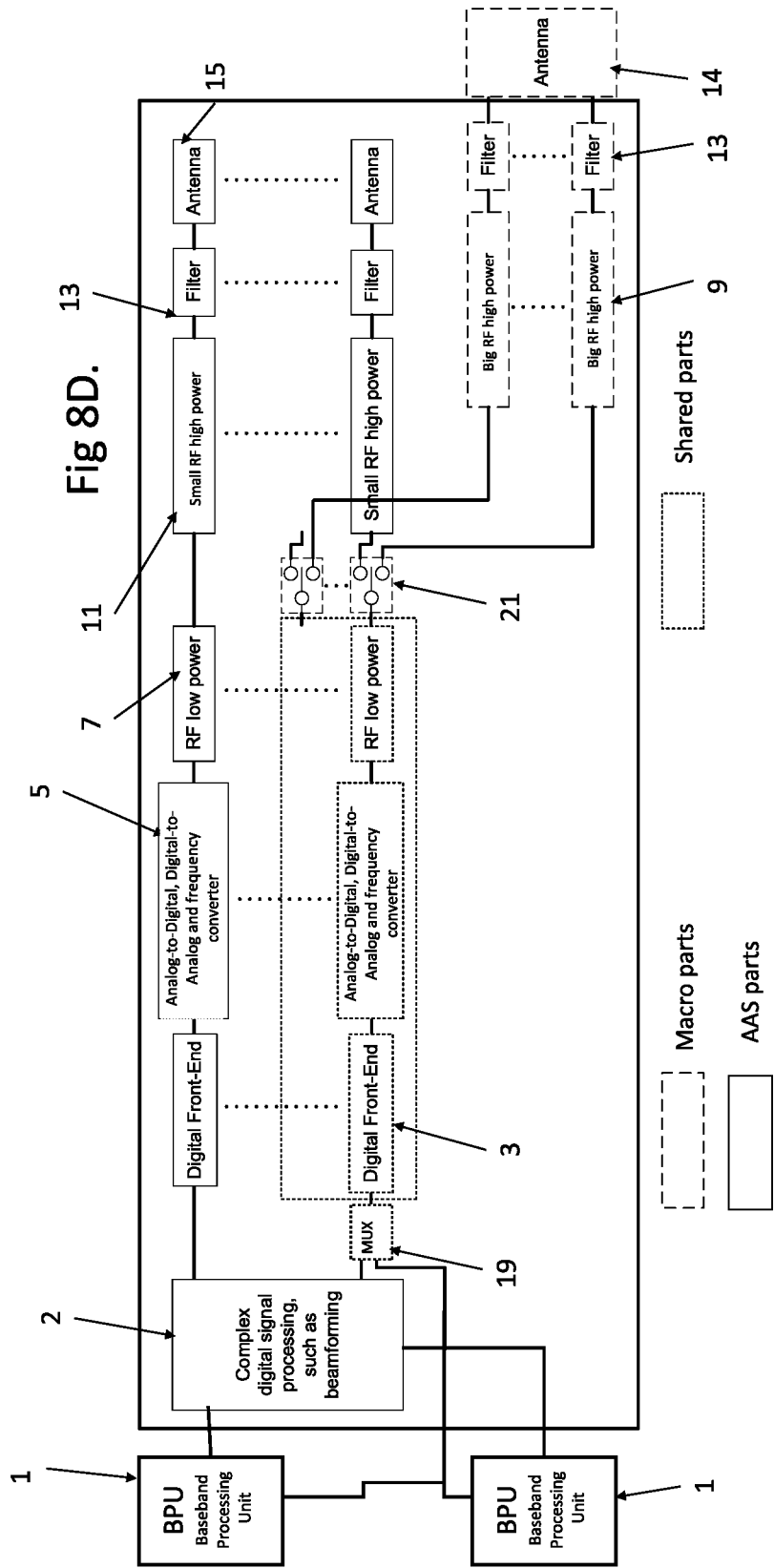

BASE STATIONS AND METHODS FOR WIRELESS COMMUNICATION NETWORKS

CROSS-REFERENCE TO RELATED APPLICATIONS

This application is a Submission Under 35 U.S.C. § 371 for U.S. National Stage Patent Application of International Application Number: PCT/CN2019/080798, filed Apr. 1, 2019 entitled "BASE STATIONS AND METHODS FOR WIRELESS COMMUNICATION NETWORKS," the entirety of which is incorporated herein by reference.

TECHNICAL FIELD

Embodiments of the present disclosure relate to base stations and methods in wireless communication networks, and particularly base stations and methods for power efficient data transmission and reception.

BACKGROUND

Network traffic demands are predicted to increase rapidly as new technologies such as 5G are adopted, driving increased energy consumption. New technologies such as beamforming often require additional antenna resources relative to older wireless telecommunication technologies.

FIG. 1 is a schematic diagram of an example of a typical macro transceiver module, as may be used in older wireless telecommunication technologies (for example, 4G technologies). The macro module is connected to a baseband processing unit (BPU) 1, which may be used to process signals for transmission, and also to process signals that have been received, using a radio module such as the macro module. The macro module itself comprises a digital front end 3 connected to two analog to digital and digital to analog converters 5 (which may also perform frequency conversion), each of which is connected in turn to a radio frequency (RF) low power block 7, amplifier (which may be a big RF high power) 9 and a filter unit 13. The RF low power block comprises components that can act to change a radio frequency signal level and/or to filter a radio frequency signal; examples of the components may include any of a receiver gain block, transmitter gain block, radio frequency filter and radio frequency attenuator. The macro module shown in FIG. 1 may be described as comprising two branches (or radio chains), each comprising a converter 5, RF low power block 7, big RF high power 9 and filter 13. The filters 13 are all connected to a large antenna unit 14, which may be physically separate from the macro module as indicated by the solid lines around the components in FIG. 1, which indicate separate physical packages (or boxes) forming parts of the base station. The antenna unit 14 may be capable of operating with a limited number of radio chains; this is a factor which may limit the total data traffic capacity of a macro module.

Macro modules are typically capable of providing a comparatively low data traffic capacity, and may not be capable of operating with new technologies. The data traffic capacity issue may be addressed by providing multiple macro modules, however this is not a cost effective solution and may lead to an increase in the cost to mobile network operators (MNOs) per bit of data traffic sent/received.

One technique used by MNOs to enable a reduced cost per bit while meeting new demands for end-user performance is the use of Advanced Antenna Systems (AAS) modules. An AAS is a hardware unit that typically comprises an antenna array 15 with many elements, a large number of radio chains (or branches) each connected to a separate antenna element, and a complex digital signal processing block 2. Typically, the power amplifier (PA, which may be a small RF high power unit) 11 of each AAS branch has small output power. The digital signal processing block 2 may be used to provide beamforming capabilities, as used in 5G technologies, and may therefore be referred to as a beamforming block 2. Beamforming may allow a base station to serve a larger number of users, or to provide an increase in capacity for a given user (for example, by directing plural beams to the given user). FIG. 2 is a schematic diagram of an example of an AAS module connected to a baseband processing unit BPU 1. The AAS module shown in FIG. 2 comprises a beamforming block 2 connected to a plurality of digital front ends 3. In the AAS module shown in FIG. 2 each digital front end 3 is connected to two analog to digital and digital to analog converters 5 (which may also perform frequency conversion), each of which is connected in turn to a RF low power block 7, a small RF high power 11 and a filter unit 13. FIG. 2 shows each of the filters as connecting to an antenna block 15, in practice each filter would typically connect to a separate antenna element within a larger antenna array 15.

"Advanced antenna systems for 5G networks" by von Butovitsch, P. et al., available at https://www.ericsson.com/en/white-papers/advanced-antenna-systems-for-5g-networks as of 18 Mar. 2019, provides a general discussion of the composition of Advanced Antenna Systems (AAS), and the use of AAS for beamforming and MIMO in 5G mobile networks.

The growth of telecommunication networks in emerging countries and the adoption of new technologies in advanced countries could face serious risks if not accompanied by design solutions and systems that are sustainable from both economic and environmental standpoints. It is therefore desirable to improve the energy efficiency of telecommunication networks, in particular, to improve the energy efficiency of base stations.

SUMMARY

It is an object of the present disclosure to provide base stations for wireless communication networks having improved power efficiency.

Embodiments of the disclosure aim to provide methods and base stations that alleviate some or all of the problems identified.

According to a first aspect of the present solution there is provided a base station for a wireless communications network, the base station comprises a baseband processing unit, a first radio module and a second radio module. The first radio module comprises a digital signal processing block connected to the baseband processing unit, wherein the digital signal processing block is further connected to a first antenna. The second radio module is connected to the baseband processing unit and comprises a second antenna, wherein the base station is configured to activate and deactivate the first radio module and second radio module based on the data capacity requirements of the wireless communication network.

According to a first aspect of the present solution there is provided a method for controlling the activation and deactivation of first and second radio modules in a base station for a wireless communication network. The base station comprises a baseband processing unit, a first radio module and a second radio module. The first radio module comprises a digital signal processing block connected to the baseband processing unit, wherein the digital signal processing block is further connected to a first antenna. The second radio module is connected to the baseband processing unit and comprises a second antenna, wherein the method comprises determining data capacity requirements of the wireless communication network by monitoring data traffic passing through the base station during a predetermined period of time; and activating and deactivating the first radio module and second radio module based on the data capacity requirements of the wireless communication network.

The activation and deactivation of the radio modules may be determined based on the data capacity requirements of the wireless communication network by monitoring data traffic passing through the base station. In this way the activation and deactivation advantageously reduces power consumption by switching on the radio module with lower power consumption and switching off the radio module with higher power consumption at times of low data capacity demand whilst ensuring high data throughput at times of high data capacity requirements by switching on the radio module with higher power consumption (and high data throughput) and switching off the radio module with lower power consumption (and lower data throughput).

Advantageously, the first radio module and second radio module may comprise shared components. In this way, the physical space required for the first and second radio modules may be reduced, and the versatility and ease of installation may thereby be improved.

Further aspects provide apparatuses and computer-readable media comprising instructions for performing the methods set out above, which may provide equivalent benefits to those set out above.

BRIEF DESCRIPTION OF DRAWINGS

For a better understanding of the present disclosure, and to show how it may be put into effect, reference will now be made, by way of example only, to the accompanying drawings, in which:

FIG. 1 is a schematic diagram of a macro transceiver module,

FIG. 2 is a schematic diagram of an AAS module,

FIG. 3 is a schematic diagram of components of a base station in accordance with an aspect of an embodiment, FIG. 4 is a flowchart illustrating a method in accordance with an aspect of an embodiment, FIG. 5 is a schematic diagram of components of a base station operating in macro mode in accordance with an aspect of an embodiment, FIG. 6 is a schematic diagram of components of a base station operating in AAS mode in accordance with an aspect of an embodiment, FIG. 7 is a schematic diagram of a switching process between radio modules in accordance with an aspect of an embodiment, and FIGS. 8A to 8D are schematic diagrams of components of base stations using different numbers of shared components.

DETAILED DESCRIPTION

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

When compared with a known macro radio transceiver, such as that shown in FIG. 1, AAS modules (see FIG. 2) have both advantages and disadvantages. AAS modules typically comprise complex digital signal processing blocks to facilitate operations such as beamforming (digital signal processing blocks that provide beamforming capabilities may also be referred to as beamforming blocks), and also to control a potentially large number of antenna elements. The operation of a plurality of separate antenna elements necessitates the use of a large number of comparatively low power amplifiers (small RF high power). By contrast, a macro radio module typically comprises a passive antenna and a remote radio unit comprising a low number (normally 1, 2, 4 or 8) of radio chains and a high output power amplifier.

The differences between AAS and macro modules as discussed above allow an AAS to significantly enhance network performance by improving end-user experience, data capacity and coverage (relative to a macro module) with beamforming and MIMO (Multiple Input, Multiple Output) techniques. However, these differences also result in a disadvantage of an AAS module relative to a macro module; the comparatively high power requirement. A certain amount of power is required by the AAS module to operate each antenna element, even in low data traffic situations. The amount of power required to operate the AAS module in low data traffic situations is typically higher than the power required to operate an equivalent macro module, which may use fewer antenna elements (for example, a single antenna) and may therefore be able to operate using a lower power level. As an example of this, a typical AAS module may require 1200 W to operate at full data traffic capacity, and 600 W to operate at minimal data traffic capacity. For a macro module, the analogous figures may be 600 W at full capacity and only 70 W at minimal traffic capacity.

The different capabilities and requirements of macro modules and AAS modules may determine which of the types of radio module is more suitable to use for a given base station serving a given geographical area. In an area wherein a comparatively high level of data traffic is expected, an AAS module may be suitable to provide a data capacity that would otherwise require a number of macro modules to provide. By contrast, in an area where a comparatively low level of data traffic is expected, a macro module may provide the necessary capacity in a more power efficient way than an AAS module.

While the use of a macro module or AAS module as discussed above may be suitable for a base station serving a geographical area having a constantly high or constantly low data traffic level, many geographic areas do not have a constant data traffic level. Instead, for many geographical areas, mobile traffic varies between busy hours and idle hours (for example: day and night, working days and holidays, and so on). With AAS modules, network performance is excellent for high data traffic scenarios, but energy efficiency is bad when data traffic levels are low. Although some of the AAS radio chains may be muted to save power, this can result in network coverage reduction. Macro modules can support low traffic with good energy efficiency, but may not be able to meet network performance (data capacity) requirements during busy hours.

Aspects of embodiments of the present invention may provide a base station which is able to satisfy data capacity requirements during high usage periods, while saving power during low usage periods. FIG. 3 is a schematic diagram of components of a base station in accordance with an aspect of an embodiment. In the system shown in FIG. 3, a combined system including an AAS module (an example of a first radio module) and a macro module (an example of a second radio module) is provided. The BPU 1 in the aspect of an embodiment shown in FIG. 3 is configured to send signals to either or both of the antenna(s) 15 of the first radio module and the antenna(s) 14 of the second radio module. In the aspect of an embodiment shown in FIG. 3, a pair of multiplexers (MUX) 19 are provided between the BPU 1 and the digital signal processing (beamforming) block 2. The multiplexers 19 may be used to divert signals to avoid the digital signal processing block 2 when the system is operating in a low capacity/low power mode. In comparison to a typical AAS module, the system of FIG. 3 includes additional components such as a switch 21, big RF high power 9, high power filter 13 and so on, and also includes a high power antenna 14. These components may operate in conjunction with components shared with the AAS module such as the digital front end 3, A-D/D-A and frequency converter 5 and RF low power 7 to form a macro transceiver module. In an aspect of an embodiment, the small RF high power 11 (amplifier) used in the first radio module may have power outputs approximately between 2 W and 4 W, and the big RF high power 9 (amplifier) used in the second radio module may have power outputs approximately between 20 W and 80 W.

The BPU and first and second radio modules of any aspect of an embodiment discussed herein (for example, the aspect of an embodiment shown in FIG. 3) may be located at a single physical location, and may be located within a single physical package or box. Alternatively, the BPU 1 and radio modules may be located in different physical locations to one another and form part of a centralised or cloud radio access network (C-RAN) or distributed RAN (D-RAN) configuration. Where a C-RAN or D-RAN configuration is used, the BPU may be connected to a plurality of radio modules, for example, using fronthaul networks (which may comprise fibreoptic connections). In C-RAN and D-RAN configurations, the components of the base station are therefore dispersed (distributed) across a larger area. The first and second radio modules may be referred to as remote radio units (RRU) or remote radio heads; the terms "first radio module" and "second radio module" are used to refer both to radio modules located proximate to the BPU and also to RRUs in distributed systems. Unless otherwise stated, all of the aspects of embodiments discussed herein may be used in C-RAN or D-RAN systems.

Using the system of FIG. 3 power consumption may be reduced by changing from AAS mode to macro mode when low data traffic is detected. This may provide energy savings as macro mode has much better energy efficiency at low traffic condition. When high data traffic conditions are detected, the configuration may be switched from macro mode to AAS mode for superior network capability and performance. The system thereby combines the benefits of AAS and macro modules. In the aspect of an embodiment shown in FIG. 3, a controller (CON) 17 of the base station is used to determine when to activate/deactivate the components of the AAS module and macro module. In configurations wherein the BPU is located remotely from the first and second radio modules, such as C-RAN or D-RAN systems as discussed above, the controller may be located in the same physical location as the BPU, or the same physical location as one or more of the radio modules (RRU), or in a further location separate from but connected to the BPU and/or radio modules.

As shown in the aspect of an embodiment of FIG. 3, the baseband processing unit may be connected to a first radio module (comprising a digital signal processing block and a first antenna) and a second radio module (comprising a second antenna), and configured to send signals to the first and second antennas. The baseband processing unit may comprise a single output for connection to both of the first and second antennas (via a MUX and other components, such as one or more filters), or may comprise separate outputs for connection to each of the antennas (via other components, such as one or more filters). The exact configuration used would depend on the specific configuration of a particular base station. As an example of this, where a distributed configuration is used and the first and second radio modules are located in a physical location that is separate from the BPU physical location, it may be efficient to connect the first and second radio modules to the BPU via a multiplexer located with the radio modules, such that a single fronthaul connection may be used to connect both the radio modules with the BPU.

In FIG. 3, the components forming part of the first radio module, which is an AAS module in this aspect of an embodiment, are identified by a solid outline. The components forming part of the second radio module, which is a macro module in this aspect of an embodiment, are identified by a dashed outline. The parts which are shared (used by the first and second radio modules) are identified by a dotted outline.

The base station may be configured to activate and deactivate the first and second radio modules, which may be an AAS module and a macro module respectively, based on the data capacity requirements of the wireless communication network. Although the data capacity requirements of the wireless communication network as a whole may be taken into account, typically the activation and deactivation of the radio modules is primarily determined based on the data capacity requirements of the geographical area (or cell) served by the base station.

FIG. 4 is a flowchart illustrating the method for determining whether or not the first and/or second radio modules should be activated/deactivated, according to an aspect of an embodiment. Typically the method is performed by a controller of the base station (as shown in FIG. 3), which is configured to determine when the activation/deactivation of the first/second radio modules should take place using an analysis of data traffic passing through the base station (potentially also using further information obtained from other components of the wireless communication network, for example estimates of expected future variations in the data capacity using predictions transmitted to the base station). Alternatively, the method may be performed by an external control, such as a control centre of the wireless communication network that may send instructions to plural base stations within the network. Where the method is performed by an external control, the base station may be configured to receive instructions from the external control, wherein the instructions instruct the base station to activate and/or deactivate the first radio module and/or second radio module. In aspects of embodiments both a controller that is part of the base station and an external control may be used, wherein one of the controller and the external control may have the ability to override the determination of the other of the controller and the external control.

Typically, base stations in accordance with aspects of embodiments may be configured to activate the first radio module at substantially the same time as deactivating the second radio module, and vice versa; essentially switching between the first and second radio modules. As a result, typically only one of the first radio module and the second radio module may be active at any time during the operation of the base station; the first radio module may be active when the data traffic capacity required is comparatively high and the second radio module may be active when the data traffic capacity required is comparatively low. However, it is possible that in some circumstances it may be advantageous for part or all of both the first and second radio modules to be active at the same time. For example, if the required data traffic capacity is unusually high, both the first and second radio modules may be activated in order to provide sufficient data traffic capacity. Where components are shared between the first and second radio modules and it is determined that both of the first and second radio modules should be active at the same time, the base station may be configured to prioritise one or the other of the two modules use of the shared components, for example, based on which of the modules would provide the highest data traffic capacity. Alternatively, the base station may be configured to allocate use of the shared components to the modules in another way, for example, by switching between the two modules at a predetermined frequency.

As shown in step S401 of the FIG. 4 flowchart, the method for determining whether or not the first and/or second radio modules should be activated/deactivated comprises monitoring data capacity requirements. As explained above, this may be the data capacity requirements only of the geographical area (cell) served by the base station, or may also include data capacity requirements of the larger wireless communication network. The monitoring of data capacity requirements may take place for a predetermined period of time after which a determination is made (see step S401A), for example, 10 minutes, or may be a constant process of monitoring the required data capacity and immediately determining if module activation or deactivation is required.

The measurements used to determine the data capacity requirements may be stored (for example, once a monitoring period of a predetermined duration has elapsed), as shown in step S603. In order to increase the robustness and accuracy of the system, and to avoid unnecessary switching between high and low capacity operational modes due to brief peaks or troughs in measured capacity usage, the measurements obtained may then be subject to one or more mathematical operations (as shown in step S404 of FIG. 4) before being used to determine the required data capacity. As an example of this, averages of the measurements may be taken, which may be mean, modal or median averages. Additionally or alternatively, standard deviations may be taken of the measurements and the standard deviations may be used to exclude outlying measurements, for example, measurements more than two standard deviations from a mean value.

The measurements (which may have been subjected to one or more mathematical operations as discussed above) may then be used to determine the data capacity requirements (see step S405). In aspects of embodiments, the monitoring of data capacity requirements may comprise the use of directional monitoring (see step S405A). In directional monitoring, different thresholds may be used, for example, to determine when to activate a first radio module and deactivate a second radio module, and when to deactivate a first radio module and activate a second radio module. This is as opposed to using a single threshold to determine when first and second radio modules should be activated/deactivated. The first radio module may provide a higher data traffic capacity, but require a higher power, than the second radio module.

A benefit which may be provided by the use of directional monitoring is that rapid switching between high capacity and low capacity modes (corresponding to operating the first radio module and second radio module respectively) when the required capacity is close to a single threshold may be avoided. As an example of this using arbitrary units; a single capacity threshold of 50 on an arbitrary data traffic capacity scale from 0 to 100 may be set as the point at which a base station switches from a low capacity and low power mode to a high capacity and high power mode. If the required capacity is constantly varying in the region between 49 and 51 (in arbitrary units), the use of a single threshold could cause the frequent shifting between modes, and energy could then be wasted due to the constant switching processes. If directional monitoring is used, the base station may be configured such that: when in high power mode a threshold to switch to low power mode of the required capacity falling below a threshold value of 40 is used; and when in low power mode a different threshold to switch to high power mode of the required capacity rising above a threshold value of 60 is used. In this example if the required capacity is constantly varying in the region between 49 and 51 (in arbitrary units) as discussed above, the base station may simply continue to use whichever of low capacity and high capacity mode it is currently operating in. Therefore, frequent switching between modes may be avoided.

The above explanation refers to the monitoring of required data capacity using arbitrary units. Various factors may be taken into consideration when assessing the required data traffic capacity, including the usage levels of physical resource blocks (PRBs), the number of radio resource control (RRC) connections, and so on. Some examples of thresholds for directional monitoring, which may be used in a system wherein the first radio module is an AAS module and the second radio module is a macro module, are listed below:

AAS_to_Macro_PRB_Threshold
AAS_to_Macro_RRC_Threshold
Macro_to_AAS_PRB_Threshold
Macro_to_AAS_RRC_Threshold The thresholds may be optimised to balance data capacity requirements and energy efficiency, depending on the specific operating situation of a given base station. Other factors may also be adjusted based on the specific operating situation of a given base station, for example, the duration of a period during which measurements are taken.

Based on the comparison between the predetermined thresholds and the measurements (potentially following mathematical operations), and potentially with reference to further information or instructions which may be provided from outside the base station, a determination as to whether or not to activate/deactivate the first radio module (see step S406A) and second radio module (see step S406B) may then be made. The base station may then be configured to activate or deactivate the radio modules as determined, or may not perform any activation or deactivation if it is determined that the current configuration of the radio modules provides a suitable data traffic capacity. As shown in FIG. 4, the method may then restart with renewed monitoring of the data capacity requirements; the cycle of monitoring data capacity requirements and activating/deactivating radio modules may continue while the base station is operational. The cycle may be performed continuously, or at a predetermined time interval, depending on the specific requirements of a given base station and wireless communication network.

FIG. 5 and FIG. 6 are schematic diagrams showing the same aspect of an embodiment as is shown in FIG. 3. In FIGS. 5 and 6, dashed lines have been used to indicate portions of the base station which may be activated when the first radio module is active (FIG. 5), and when the second radio module is active (FIG. 6). The controller (CON), as shown in FIG. 3, has been omitted from FIGS. 5 and 6. The aspect of an embodiment shown in FIGS. 3, 5 and 6 is configured so that only one of the first radio module and second radio module is active at any one time, that is, the first radio module is deactivated as the second radio module is activated and vice versa. The key components (or parts) that are working in FIG. 5 are the first radio module and the BPU 1 of the depicted aspect of an embodiment (multiplexers 19 and switches 21 are also used). The components (or parts) that are working in FIG. 6 are the second radio module and the BPU 1 of the depicted aspect of an embodiment (multiplexers 19 and switches 21 are also used). When operating in AAS mode, the BPU 1 as shown in FIG. 5 is connected to the antenna elements 15 via the beamforming block 2, digital front end 3, converter 5, RF low power block 7, small RF high power 11 and filter 13. When operating in macro mode, the BPU 1 of FIG. 6 is connected to the antenna elements 14 via the digital front end 3, converter 5, RF low power block 7, big RF high power 9 and high power filter 13. As will be understood, other components beyond those shown in the figures may also be included in the connection paths between the BPU and the antennas (for example, multiplexers 19 and switches 21). The connection paths may also include portions of a fronthaul network (for example, fibre optic cables) where the base station is a distributed base station, as discussed above.

The switching between the radio modules is depicted schematically in FIG. 7, where the first radio module is the AAS module and the second radio module is the macro module. As shown in FIG. 7, a small number of high power ports (1 to m) may be active in macro mode, and a larger number of low power ports (1 to n) may be active in AAS mode. In this example, n is larger than m, and AAS mode provides a higher data traffic capacity than macro mode.

In the aspect of an embodiment shown in FIGS. 3, 5 and 6 the first radio module is an AAS module, and the second radio module is a macro module. As can be seen by comparing FIGS. 5 and 6, in the aspect of an embodiment depicted in those figures several components are shared between the first and second radio modules. In particular, multiplexers, digital front-end, radio frequency low power block and analog to digital and digital to analog converter (which may also perform frequency conversion) are all shared between the first and second radio modules of the depicted aspect of an embodiment. The components that are used in the macro module, in additional to the components shared with the AAS module, therefore comprise the big RF high power, high power filter and high power antenna. As will be understood, other components beyond those listed above may also be included in the radio modules, or shared between the modules.

The number of components that may be shared between the first radio module and second radio module may vary in different aspects of embodiments, depending on the specific requirements of a given base station. By increasing the number of components shared between the first and second radio modules, the overall physical size of the first and second radio modules (in combination) may be reduced, however more complex engineering may be required to integrate the two modules. In some aspects of embodiments the first and second radio modules may be contained within a single physical package or box for installation; typically these aspects of embodiments share large numbers of components between the first and second radio modules. Alternatively, the first and second radio modules may be contained within separate physical packages or boxes, which may be connected together by signal links (e.g. wires, fibre optics) to allow the sharing of components between the first and second radio modules, or may be simply connected at a baseband processing unit. Where the first and second radio modules are connected at a baseband processing unit (either as the only connection between the radio modules, or as one of several connections between the modules), the connections to the baseband processing unit may use a multiplexer and a shared physical connection to the baseband processing unit, or separate physical connections to the baseband processing unit, as discussed above.

Several systems having differing levels of shared use of components are shown in FIG. 8. In FIG. 8A the macro parts are indicated by a dotted outline, and the AAS parts are indicated by a solid line. In FIGS. 8B, 8C and 8D the macro parts are indicated by a dashed outline, the AAS parts are indicated by a solid line, and the shared parts are indicated by a dotted line. FIG. 8 shows only some of the combinations of shared components that may be used; as will be appreciated other combinations of components may also be used.

FIG. 8A shows a base station in which there is no integration between the systems of the first radio module (AAS module) and the second radio module (macro module); as indicated in that figure the AAS module and macro module are separate within the base station and there are no shared parts. The AAS module and macro module of the base station shown in FIG. 8A are connected to the baseband processing unit 1 using separate physical connections; as explained above separate physical connections between the radio modules and the BPU 1 may be used as an alternative to the use of a multiplexer 19. The system shown in FIG. 8A is essentially a macro module and an AAS module within a single base station (potentially within a single physical package or box, although FIG. 8A shows the antenna 14 of the macro module in a separate package). Although simple, this system would typically be physically larger than the systems shown in FIGS. 8B to 8D (all other factors, such as the number of antenna branches, being equal). This can cause issues when installing the system, particularly on base stations already crowded with components, and therefore it is desirable to provide physically smaller systems having a greater number of shared components.

FIG. 8B shows an aspect of an embodiment in which the first and second radio modules share some components. In particular, one of the digital front ends 3 of the first radio module (which is an AAS module) is shared with the second radio module (which is a macro module). Similarly to the system shown in FIG. 8A, the AAS module and macro module of the aspect of an embodiment shown in FIG. 8B are connected to the baseband processing unit 1 using separate physical connections instead of a multiplexer 19. Aspects of embodiments may use separate physical connections or a multiplexer 19 to connect the BPU 1 to the radio modules; the decision of how to connect the radio modules to the BPU 1 may be made with reference to the physical layout of the components within the base station. In the aspect of an embodiment shown in FIG. 8B, further components are not shared between the first and second modules, therefore the base station comprises an A-D/D-A and frequency converter 5, RF low power block 7, small RF high power 11, filter 13 and antenna (element) 15 for each branch of the AAS module, and also an A-D/D-A and frequency converter 5, RF low power block 7, big RF high power 9 and filter 13 for each branch of the macro module (wherein the filters of the macro module are connected to a separate antenna 14 shared by the branches of the macro module). Multiplexers 19 are also included to direct signals to the correct radio module branches. The aspect of an embodiment shown in FIG. 8B uses some shared components, and therefore may be physically smaller than the system shown in FIG. 8A.

FIGS. 8C and 8D show further aspects of embodiments in which the first and second radio modules share components. The first and second radio modules of the aspects of embodiments shown in FIGS. 8C and 8D share more components than the aspect of an embodiment shown in FIG. 8B. More specifically, FIG. 8C shows the use of a shared A-D/D-A and frequency converter 5 (in addition to the components shared in the FIG. 8B aspect), and FIG. 8D shows the shared use of all the components shared in FIG. 8C and also a RF low power block 7. The positioning of switches 21 in the base stations is dependent on the number and type of components shared between the first and second radio modules, as shown by way of example in FIGS. 8B to 8D and as will be understood. Similarly to the aspect of an embodiment shown in FIG. 8B, and contrary to the aspect of an embodiment shown in FIGS. 3, 5 and 6, the AAS module and macro module of the aspects of embodiments shown in FIGS. 8C and 8D are connected to the baseband processing unit 1 using separate physical connections. In some aspects of embodiments, the base station may comprise plural baseband processing units 1; an example of this is shown in FIG. 8D. In the aspect of an embodiment shown in FIG. 8D there are two baseband processing units, both of which are connected to the first radio module and second radio module. In some aspects of embodiments where plural BPUs are present, one or more of the BPUs may be connected to first and second radio modules, and one or more of the BPUs may not be connected to both first and second radio modules.

In the FIG. 8D aspect, only the big RF high power 9, filter 13 and antenna 14 of the macro module are not shared with the AAS module. This is the same degree of sharing as is used in the aspect of an embodiment shown in FIGS. 3, 5 and 6. By increasing the number of components shared between the radio modules, the overall size of the system as a whole may be minimised as discussed above.

By providing a base station comprising components of first and second radio modules (which may be AAS modules and macro modules respectively) and configuring the base station to activate and deactivate the first radio module and second radio module based on the data capacity requirements of the wireless communication network, the energy efficiency of the wireless communication network may be improved while minimising negative impacts on the data traffic capacity. Further, by sharing components between the first and second radio modules, the physical size of the combination of first and second radio modules may be minimised, which can improve the ease with which the first and second radio modules may be installed and thereby improve the versatility of the system. Although the above text refers to the base station comprising a first radio module and a second radio module, it will be understood that a base station may comprise a plurality of first and second radio modules, and may switch between different combinations of first and second radio modules as required by data traffic capacity requirements at a given time. Also, and as discussed above, the base station may comprise plural baseband processing units. The BPU (or BPUs) and first and second radio modules may all be located at the same physical location, or may be located at different physical locations as part of a C-RAN or D-RAN configuration.

It will be understood that the detailed examples outlined above are merely examples. According to embodiments herein, the steps may be presented in a different order to that described herein. Furthermore, additional steps may be incorporated in the method that are not explicitly recited above. For the avoidance of doubt, the scope of protection is defined by the claims.

The invention claimed is:

1. A base station for a wireless communications network comprising:
   a baseband processing unit;
   a first radio module comprising a digital signal processing block connected to the baseband processing unit, the digital signal processing block being further connected to a first antenna;
   a second radio module connected to the baseband processing unit and comprising a second antenna; and
   the base station being configured to activate and deactivate the first radio module and second radio module based on data capacity requirements of the wireless communication network, the first radio module being activated when the data capacity requirements are in a first range and the second radio module being activated when the data capacity requirements are in a second range lower than the first range.

2. The base station of claim 1, wherein the first radio module and second radio module are connected to the baseband processing unit via a multiplexer.

3. The base station of claim 1, wherein the first radio module and second radio module comprise shared components.

4. The base station of claim 3, wherein the shared components comprise at least one of:
   a digital front end;
   a radio frequency low power block; and
   an analog to digital, digital to analog and frequency converter.

5. The base station of claim 1, wherein the first radio module comprises a first amplifier and the second radio module comprises a second amplifier.

6. The base station of claim 5, wherein the first amplifier has a lower output power than the second amplifier.

7. The base station of claim 1, wherein the digital signal processing block is a beamforming block.

8. The base station of claim 1, wherein the first radio module comprises plural first antenna branches.

9. The base station of claim 8, wherein each of the first antenna branches comprises at least one of:
   an analog to digital, digital to analog and frequency converter;
   a radio frequency low power block; and
   a first amplifier.

10. The base station of claim 1, wherein the first radio module has a larger data transmission and reception capability than the second radio module.

11. The base station of claim 1, further configured to deactivate the first radio module when activating the second radio module, and to deactivate the second radio module when activating the first radio module.

12. The base station of claim 1, wherein the data capacity requirements are calculated by monitoring data traffic passing through the base station during a predetermined period of time.

13. The base station of claim 1, comprising a plurality of first and second radio modules.

14. The base station of claim 1, wherein the baseband processing unit is located remotely from the first radio module and second radio module, and is connected to the first radio module and second radio module using a fronthaul network.

15. The base station of claim 1, further comprising a second baseband processing unit that is connected to the first radio module and the second radio module.

16. A method for controlling the activation and deactivation of first and second radio modules in a base station for a wireless communication network, the base station comprising:
   a baseband processing unit;
   a first radio module comprising a digital signal processing block connected to the baseband processing unit, the digital signal processing block being further connected to a first antenna; and
   a second radio module connected to the baseband processing unit and comprising a second antenna,
   the method comprising:
      determining data capacity requirements of the wireless communication network by monitoring data traffic passing through the base station during a predetermined period of time; and
      activating and deactivating the first radio module and second radio module based on data capacity requirements of the wireless communication network, the first radio module being activated when the data capacity requirements are in a first range and the second radio module being activated when the data capacity requirements are in a second range lower than the first range.

17. The method of claim 16, wherein the monitoring of data traffic comprises directional monitoring of the data traffic.

18. The method of claim 16, wherein the monitoring of data traffic comprises monitoring at least one of the usage of physical resource blocks and the number of radio resource control connections.

19. The method of claim 16, wherein the monitoring of data traffic comprises taking a plurality of measurements of the data traffic during the predetermined period of time, calculating averages of the measurements, and determining the data capacity requirements based on the calculated averages.

20. The method of claim 16, wherein the method comprises deactivating the first radio module when activating the second radio module, and deactivating the second radio module when activating the first radio module.

* * * * *